US011661505B2

(12) United States Patent
Park et al.

(10) Patent No.: US 11,661,505 B2
(45) Date of Patent: *May 30, 2023

(54) THERMOPLASTIC RESIN COMPOSITION AND MOLDED ARTICLE PRODUCED THEREFROM

(71) Applicant: LOTTE CHEMICAL CORPORATION, Seoul (KR)

(72) Inventors: Jee Kwon Park, Uiwang-si (KR); Cheon Seok Yang, Uiwang-si (KR); Hyeon Mun Jeong, Uiwang-si (KR); Ju Sung Kim, Uiwang-si (KR); Jin Seong Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 115 days.

This patent is subject to a terminal disclaimer.

(21) Appl. No.: 17/281,017

(22) PCT Filed: Dec. 5, 2019

(86) PCT No.: PCT/KR2019/017109
§ 371 (c)(1),
(2) Date: Mar. 29, 2021

(87) PCT Pub. No.: WO2020/130435
PCT Pub. Date: Jun. 25, 2020

(65) Prior Publication Data
US 2021/0340366 A1    Nov. 4, 2021

(30) Foreign Application Priority Data
Dec. 21, 2018   (KR) .................. 10-2018-0167865

(51) Int. Cl.
| | |
|---|---|
| *C08L 23/12* | (2006.01) |
| *C08K 3/016* | (2018.01) |
| *A01N 59/00* | (2006.01) |
| *C08K 5/52* | (2006.01) |
| *C08K 3/22* | (2006.01) |
| *C08K 3/32* | (2006.01) |

(52) U.S. Cl.
CPC .............. *C08L 23/12* (2013.01); *A01N 59/00* (2013.01); *C08K 3/016* (2018.01); *C08K 3/22* (2013.01); *C08K 3/32* (2013.01); *C08K 5/5205* (2013.01); *C08K 2003/2296* (2013.01); *C08K 2003/324* (2013.01); *C08K 2201/005* (2013.01); *C08K 2201/006* (2013.01)

(58) Field of Classification Search
CPC ................ C08K 3/22; C08K 2003/324; C08K 2003/2296
See application file for complete search history.

(56) References Cited

U.S. PATENT DOCUMENTS

| | | | | |
|---|---|---|---|---|
| 3,649,591 | A * | 3/1972 | Murray | ................. C08K 3/32 |
| | | | | 524/121 |
| 5,714,545 | A | 2/1998 | Lee et al. | |
| 9,240,260 | B2 * | 1/2016 | Hatanaka | ............... H01B 3/446 |
| 10,233,317 | B2 * | 3/2019 | Kabeya | .................. C09K 21/12 |
| 10,472,490 | B2 | 11/2019 | Yang et al. | |
| 10,544,278 | B2 | 1/2020 | Bae et al. | |
| 2005/0043485 | A1 | 2/2005 | Lee et al. | |
| 2005/0048010 | A1 | 3/2005 | Kliss et al. | |
| 2009/0170735 | A1 | 7/2009 | Park et al. | |
| 2012/0329920 | A1 | 12/2012 | Sato et al. | |
| 2014/0187662 | A1 | 7/2014 | Lee et al. | |
| 2015/0322252 | A1 | 11/2015 | Arechederra | |
| 2017/0275448 | A1 | 9/2017 | Kim et al. | |
| 2018/0016419 | A1 | 1/2018 | Shimizu et al. | |
| 2018/0112056 | A1 | 4/2018 | Yang et al. | |
| 2018/0118914 | A1 | 5/2018 | Bae et al. | |
| 2018/0265683 | A1 | 9/2018 | Shimizu et al. | |
| 2021/0032451 | A1 | 2/2021 | Chu | |
| 2021/0340366 | A1 | 11/2021 | Park et al. | |

FOREIGN PATENT DOCUMENTS

| | | |
|---|---|---|
| CN | 101469104 A | 7/2009 |
| CN | 103911000 A | 7/2014 |
| CN | 106188784 A | 12/2016 |
| CN | 106279897 A | 1/2017 |
| CN | 107075236 A | 8/2017 |
| CN | 107108984 A | 8/2017 |
| CN | 107207806 A | 9/2017 |

(Continued)

OTHER PUBLICATIONS

Derwent Abstract of 3649591 showing equivalent of JP 47009247 (Acc. No. 1972-23941T, 2 pages).*
CAPlus Abstractor JP 54004946 (1979, 1 page).*
Machine translation of JP 54004946 (2022, 2 pages).*
Human translation of JP 54004946 (2022, 10 pages).*
Human translation of JP 54004946 (1979, 10 pages).*
International Search Report in commonly owned International Application No. PCT/KR2019/002541 dated Jun. 13, 2019, pp. 1-6.
Mjayaraghavan, Rajagopalan etc., "Insight into the Mechanism of Antibacterial Activity of ZnO: Surface Defects Mediated Reactive Oxygen Species Even in the Dark", Langmuir, 2015, vol. 31, No. 33, pp. 9155-9162.
Search Report in commonly owned European Application No. 19777697.4 dated Nov. 29, 2021, pp. 1-4.

(Continued)

*Primary Examiner* — Brieann R Johnston
(74) *Attorney, Agent, or Firm* — Additon, Pendleton & Witherspoon, P.A.

(57) ABSTRACT

A thermoplastic resin composition of the present invention is characterized by including: about 100 parts by weight of a polyolefin resin; about 10-80 parts by weight of a flame retardant other than sodium phosphate; about 1-25 parts by weight of zinc oxide having an average particle size of about 0.2-3 μm and a specific surface area BET of about 1-10 m$^2$/g; and about 1-50 parts by weight of sodium phosphate. The thermoplastic resin composition has excellent antibacterial properties, flame retardant properties, chemical-resistant antibacterial properties, and the like.

17 Claims, No Drawings

(56) References Cited

FOREIGN PATENT DOCUMENTS

| | | | |
|---|---|---|---|
| CN | 107974030 A | | 5/2018 |
| CN | 108003492 A | | 5/2018 |
| CN | 108948530 A | | 12/2018 |
| EP | 3315546 A1 | | 5/2018 |
| JP | 54004946 A | * | 1/1979 |
| JP | 10-231429 A | | 9/1998 |
| JP | 11-263705 A | | 9/1999 |
| JP | 2005-068430 A | | 3/2005 |
| JP | 2006-129902 A | | 5/2006 |
| JP | 2016-501963 A | | 1/2016 |
| JP | 2018-070881 A | | 5/2018 |
| JP | 2018-070884 A | | 5/2018 |
| KR | 10-0696385 B1 | | 3/2007 |
| KR | 10-2008-0093788 A | | 10/2008 |
| KR | 10-0988999 B1 | | 10/2010 |
| KR | 10-2012-0116160 A | | 10/2012 |
| KR | 10-2014-0087663 A | | 7/2014 |
| KR | 10-2015-0068866 A | | 6/2015 |
| KR | 10-2017-0115486 A | | 10/2017 |
| KR | 10-2018-0113040 A | | 10/2018 |
| WO | 2019/190068 A1 | | 10/2019 |
| WO | 2020/130435 A1 | | 6/2020 |

OTHER PUBLICATIONS

ZnO-Series Product Description from Hanil Chemical, www.hanzinc.com/new/eng/business/product/ product01.asp, accessed on Aug. 17, 2022, 3-page website printout (2022) (Year: 2022).

E. N. Kresge, "Polyolefin Thermoplastic Elastomer Blends," 64 Rubber Chemistry and Technology 469-79 (1990) (Year: 1990).

Office Action in commonly owned U.S. Appl. No. 17/043,035 dated Aug. 23, 2022, pp. 1-13.

International Search Report in counterpart International Application No. PCT/KR2019/017109 dated Mar. 20, 2020, pp. 1-6.

Office Action in commonly owned Japanese Application No. 2020-552285 dated Nov. 1, 2022, pp. 1-2.

Office Action in counterpart Chinese Application No. 201980076022.7 dated Oct. 14, 2022, pp. 1-8.

Office Action in commonly owned Chinese Application No. 201980032214.8 dated Sep. 2, 2022, pp. 1-6.

Extended Search Report in counterpart European Application No. 19898820.6 dated Jul. 20, 2022, pp. 1-4.

* cited by examiner

THERMOPLASTIC RESIN COMPOSITION AND MOLDED ARTICLE PRODUCED THEREFROM

CROSS-REFERENCE TO RELATED APPLICATIONS

This application claims priority to and the benefit of International Application No. PCT/KR2019/017109, filed Dec. 5, 2019, which published as WO 2020/130435 on Jun. 25, 2020, and Korean Patent Application No. 10-2018-0167865, filed in the Korean Intellectual Property Office on Dec. 21, 2018, the entire disclosure of each of which is incorporated herein by reference.

TECHNICAL FIELD

The present invention relates to a thermoplastic resin composition and a molded article produced therefrom. More particularly, the present invention relates to a thermoplastic resin composition having good properties in terms of flame retardancy, antibacterial properties, chemical and bacterial resistance, and the like, and a molded article formed of the same.

BACKGROUND ART

Thermoplastic resins have good properties in terms of mechanical properties, processability, external appearance, and the like, and is broadly used as interior/exterior materials for electric/electronic products, interior/exterior materials for automobiles, exterior material for buildings, and the like.

When such resins are used for applications entailing physical contact with the body, such as household electronic devices, medical devices, and the like, the resins are required to have antibacterial properties to remove or suppress bacteria, and such antibacterial properties should be maintained even when a thermoplastic resin product is washed with a chemical agent such as a detergent. Further, the resins are also required to have flame retardancy to prevent fire hazards, and the like. Although an inorganic or organic antimicrobial may be used to obtain a thermoplastic resin composition having antibacterial properties, the inorganic antimicrobial may cause discoloration and deterioration in transparency and flame retardancy of the thermoplastic resin, and the organic antimicrobial may be decomposed or eluted during processing at high temperature, thereby making application thereof difficult in practice.

Therefore, there is a need for a thermoplastic resin composition that is excellent in flame retardancy, antibacterial properties, chemical and bacterial resistance.

The background technique of the present invention is disclosed in Korean Patent No. 10-0988999.

DISCLOSURE

Technical Problem

It is one object of the present invention to provide a thermoplastic resin composition having good properties in terms of flame retardancy, antibacterial properties, chemical and bacterial resistance, and the like.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises about 100 parts by weight of a polyolefin resin; about 10 parts by weight to about 80 parts by weight of a flame retardant excluding sodium phosphate; about 1 part by weight to about 25 parts by weight of a zinc oxide having an average particle size of about 0.2 μm to about 3 μm and a BET specific surface area of about 1 m²/g to about 10 m²/g; and about 1 part by weight to about 50 parts by weight of a sodium phosphate.

2. In Embodiment 1, the polyolefin resin may include at least one of polypropylene, polyethylene, and propylene-ethylene copolymer.

3. In Embodiments 1 to 2, the flame retardant may include at least one of phosphorus-nitrogen-based flame retardants, nitrogen-based flame retardants, phosphorus-based flame retardants, halogen-based flame retardants, and antimony-based flame retardants.

4. In Embodiments 1 to 3, the flame retardant may include at least one of phosphorus-nitrogen-based flame retardants and nitrogen-based flame retardants.

5. In Embodiments 1 to 4, the zinc oxide may have a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement.

6. In Embodiments 1 to 5, the zinc oxide may have a peak position (2θ) in the range of 35° to 37° and a crystallite size of about 1,000 Å to about 2,000 Å, in X-ray diffraction (XRD) analysis, as calculated by Equation 1:

$$\text{Crystallite size}(D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

7. In Embodiments 1 to 6, a weight ratio of the flame retardant to the zinc oxide may range from about 2:1 to about 15:1.

8. In Embodiments 1 to 7, a weight ratio of the zinc oxide to the sodium phosphate may range from about 1:0.5 to about 1:3.

9. In Embodiments 1 to 8, the thermoplastic resin composition may have an antibacterial activity of about 2 to about 7 against each of *Staphylococcus aureus* and *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

10. In Embodiments 1 to 9, the thermoplastic resin composition may have a flame retardancy of V-0 or higher, as measured on a 1.5 mm thick specimen in accordance with UL-94 vertical test.

11. In Embodiments 1 to 10, the thermoplastic resin composition may have an antibacterial activity of about 2 to about 6.5 against each of *Staphylococcus aureus* and *Escherichia coli*, as measured on a 5 cm×5 cm specimen in accordance with JIS Z 2801, in which the specimen is prepared by immersing an injection molded specimen in an acidic detergent for 24 hours, taking out the specimen, inoculating *Staphylococcus aureus* and *Escherichia coli* into each specimen, followed by culturing under conditions of 35° C. and 90% RH for 24 hours.

12. Another aspect of the present invention relates to a molded article. The molded article may be formed of the thermoplastic resin composition according to any one of Embodiments 1 to 11.

Advantageous Effects

The present invention provides a thermoplastic resin composition having good properties in terms of flame retardancy, antibacterial properties, chemical and bacterial resistance, and the like and a molded article formed of the same.

BEST MODE

Hereinafter, embodiments of the present invention will be described in detail.

A thermoplastic resin composition according to the present invention comprises (A) a polyolefin resin; (B) a flame retardant; (C) a zinc oxide; and (D) a sodium phosphate.

As used herein to represent a specific numerical range, the expression "a to b" means "≥a and ≤b".

(A) Polyolefin Resin

According to an embodiment of the invention, the polyolefin resin may serve to improve fluidity, chemical and bacterial resistance of the thermoplastic resin composition while imparting low specific gravity to the thermoplastic resin composition, and any commercially available polyolefin resin can be used. Examples of the polyolefin resin may include polyethylene-based resins including polyethylenes such as low-density polyethylene (LDPE), medium-density polyethylene (MDPE), high-density polyethylene (HDPE), and linear low-density polyethylene (LLDPE), ethylene-vinyl acetate copolymer (EVA), ethylene-acrylate copolymer, or mixtures thereof; polypropylene-based resins such as polypropylene, propylene-ethylene copolymer, propylene-1-butene copolymer, or mixtures thereof cross-linked polymers thereof; blends thereof with polyisobutene; or combinations thereof. In an embodiment, polypropylene, polyethylene, propylene-ethylene copolymer, combinations thereof can be used.

In some embodiments, the polyolefin resin may have a weight average molecular weight (Mw) of about 10,000 g/mol to about 400,000 g/mol, for example, about 15,000 g/mol to about 350,000 g/mol, as measured by gel permeation chromatography (GPC). Within this range, the thermoplastic resin composition may have good mechanical strength, fluidity (molding processability), chemical and bacterial resistance, and the like.

(B) Flame Retardant

According to the embodiment of the invention, the flame retardant serves to improve both flame retardancy and antibacterial properties of the thermoplastic resin composition together with a combination of zinc oxide and sodium phosphate. Examples of the flame retardant may include at least one of phosphorus-nitrogen-based flame retardants, nitrogen-based flame retardants, phosphorus-based flame retardants excluding sodium phosphate, halogen-based flame retardants, and antimony-based flame retardants. Specifically, examples of the flame retardant may include phosphorus-nitrogen-based flame retardants, nitrogen-based flame retardants or a combination thereof.

In some embodiments, examples of the phosphorus-nitrogen-based flame retardants, nitrogen-based flame retardants or a combination thereof may include piperazine pyrophosphate (PPP), melamine polyphosphate (MPP), ammonium polyphosphate (APP), melamine cyanurate, or combinations thereof.

In some embodiments, examples of the phosphorus-based flame retardants may include phosphate compounds, phosphonate compounds, phosphinate compounds, phosphine oxide compounds, phosphazene compounds, or metal salts thereof. These compounds may be used alone or as a mixture of two or more.

In some embodiments, the phosphorus-based flame retardant may include an aromatic phosphoric acid ester (phosphate) compound represented by Formula 1:

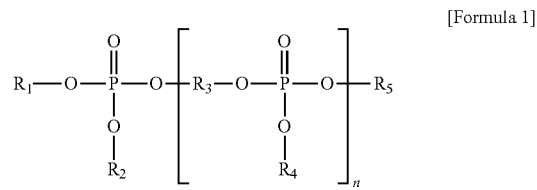

[Formula 1]

where $R_1$, $R_2$, $R_4$ and $R_5$ are each independently a hydrogen atom, a $C_6$ to $C_{20}$ aryl group, or a $C_1$ to $C_{10}$ alkyl-substituted $C_6$ to $C_{20}$ aryl group; $R_3$ is a $C_6$ to $C_{20}$ arylene group or a $C_1$ to $C_{10}$ alkyl-substituted $C_6$ to $C_{20}$ arylene group, for example, derivatives of dialcohol, such as resorcinol, hydroquinone, bisphenol-A, or bisphenol-S; and n is an integer of 0 to 10, for example, 0 to 4.

When n is 0 in Formula 1, examples of the aromatic phosphoric acid ester compound may include diaryl phosphate such as diphenyl phosphate, triphenyl phosphate, tricresyl phosphate, trixylenyl phosphate, tri(2,6-dimethylphenyl)phosphate, tri(2,4,6-trimethylphenyl)phosphate, tri(2,4-di-tert-butylphenyl)phosphate, and tri(2,6-dimethylphenyl)phosphate; and when n is 1 in Formula 1, examples of the aromatic phosphoric ester compound may include bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl) phosphate], and hydroquinone bis[bis(2,4-di-tert-butylphenyl)phosphate], and when n is 2 or more in Formula 1, examples of the aromatic phosphoric ester compound may include an oligomer type phosphoric ester compound, without being limited thereto. These compounds may be used alone or as a mixture of two or more.

In some embodiments, examples of the halogen-based flame retardants may include decabromodiphenyl oxide, decabromodiphenyl ethane, decabromodiphenyl ether, tetrabromobisphenol A, tetrabromobisphenol A-epoxy oligomer, brominated epoxy oligomer, octabromo trimethyl phenylindan, ethylenebis(tetrabromo phthalimide), 2,4,6-tris(2,4,6-tribromophenoxy)-1,3,5-triazine, and the like. Examples of the antimony-based flame retardants may include antimony trioxide, antimony pentoxide and the like. These can be used alone or in combination of two or more. Here, the halogen-based flame retardants and the antimony-based flame retardants may be present in a weight ratio (halogen-based flame retardants:antimony-based flame retardants) of about 2:1 to about 6:1, for example, about 3:1 to about 5:1. Within this range, the thermoplastic resin composition may achieve good flame retardancy even with a small amount of flame retardant.

In some embodiments, the flame retardant may be present in an amount of about 10 parts by weight to about 80 parts by weight, for example, about 15 parts by weight to about 75 parts by weight, specifically, about 20 parts by weight to about 70 parts by weight, relative to about 100 parts by weight of the thermoplastic resin. If the amount of the flame retardant is less than 10 parts by weight, the thermoplastic resin composition can suffer from deterioration in flame retardancy. If the amount of the flame retardant is more than 80 parts by weight, antibacterial properties, processability (extrusion stability), impact resistance, thermal stability of the thermoplastic resin composition could be deteriorated.

(C) Zinc Oxide

According to the present invention, the zinc oxide serves to improve flame retardancy, antibacterial properties, chemical and bacterial resistance, weather resistance (UV resistance) and impact resistance of the thermoplastic resin composition together with the flame retardant and the sodium phosphate. The zinc oxide may have an average particle diameter (D50) of primary particles (not forming a secondary particle through agglomeration of particles) of about 0.2 μm to about 3 μm, for example, about 0.5 μm to about 3 μm, as measured using a particle size analyzer (Laser Diffraction Particle Size Analyzer LS 13 320, Beckman Coulter Co., Ltd.). Further, the zinc oxide may have a BET specific surface area of about 1 m$^2$/g to about 10 m$^2$/g, for example, about 1 m$^2$/g to about 7 m$^2$/g, as measured by a nitrogen gas adsorption method using a BET analyzer (Surface Area and Porosity Analyzer ASAP 2020, Micromeritics Co., Ltd.) and may have a purity of about 99% or higher. If these parameters of the zinc oxide are outside these ranges, the thermoplastic resin composition may have poor properties in terms of weather resistance and antibacterial properties.

In some embodiments, the zinc oxide may have various shape, for example, a spherical shape, a plate shape, a rod shape, a combination thereof, and the like.

In some embodiments, the zinc oxide may have a peak intensity ratio (B/A) of about 0.01 to about 1.0, for example, about 0.1 to about 1.0, specifically about 0.1 to about 0.5, where A indicates a peak in the wavelength range of 370 nm to 390 nm and B indicates a peak in the wavelength range of 450 nm to 600 nm in photoluminescence measurement. Within this range, the thermoplastic resin composition may have good properties in terms of weather resistance, antibacterial properties, impact resistance and the like.

In one embodiment, the zinc oxide may have a peak position degree (2θ) in the range of 35° to 37° and a crystallite size of about 1,000 Å to about 2,000 Å, for example, about 1,200 Å to about 1,800 Å in analysis of X-ray diffraction (XRD), as calculated by Scherrer's Equation (Equation 1) with reference to a measured FWHM value (full width at half maximum of a diffraction peak). Within this range, the thermoplastic resin composition may have good properties in terms of initial color, weather resistance, antibacterial properties, and the like.

$$\text{Crystallite size}(D) = \frac{K\lambda}{\beta\cos\theta} \quad \text{[Equation 1]}$$

where K is a shape factor, λ is an X-ray wavelength, β is an FWHM value (degree), and θ is a peak position degree.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., followed by heating the reactor to about 400° C. to about 900° C., for example about 500° C. to about 800° C. for about 30 minutes to about 150 minutes, for example, about 60 minutes to about 120 minutes.

In some embodiments, the zinc oxide may be present in an amount of about 1 part by weight to about 25 parts by weight, for example, about 2 parts by weight to about 20 parts by weight, relative to about 100 parts by weight of the thermoplastic resin. If the amount of the zinc oxide is less than 1 part by weight, the thermoplastic resin composition can suffer from deterioration in antibacterial properties. If the amount of the zinc oxide is more than 25 parts by weight, flame retardancy, processability, impact resistance of the thermoplastic resin composition could be deteriorated.

In some embodiments, the flame retardant and the zinc oxide may be present in a weight ratio (flame retardant:zinc oxide) of about 2:1 to about 15:1, for example, about 3:1 to about 10:1. Within this range, the thermoplastic resin composition may have further improved properties in terms of antibacterial properties, flame retardancy and weather resistance.

(D) Sodium Phosphate

The sodium phosphate can serve to improve both antibacterial properties and flame retardancy of the thermoplastic resin composition together with the flame retardant and the zinc oxide, and any commercially available sodium phosphate can be used.

In some embodiments, the sodium phosphate may be monosodium phosphate($NaH_2PO_4$) and/or disodium phosphate($Na_2HPO_4$).

In some embodiments, the sodium phosphate may be present in an amount of about 1 part by weight to about 50 parts by weight, for example, about 2 parts by weight to about 40 parts by weight, relative to about 100 parts by weight of the thermoplastic resin. If the amount of the sodium phosphate is less than 1 part by weight, the thermoplastic resin composition can suffer from deterioration in flame retardancy and antibacterial properties. If the amount of the sodium phosphate is more than 50 parts by weight, flame retardancy, processability, impact resistance of the thermoplastic resin composition could be deteriorated.

In some embodiments, the zinc oxide and the sodium phosphate may be present in a weight ratio (zinc oxide: sodium phosphate) of about 1:0.5 to about 1:3, for example, about 1:1 to about 1:2. Within this range, the thermoplastic resin composition may have further improved properties in terms of flame retardancy, antibacterial properties, chemical and bacterial resistance and balance therebetween.

In one embodiment, the thermoplastic resin composition may further include any typical additive included in thermoplastic resin compositions. Examples of the additive may include fillers, an antioxidant, an anti-dripping agent, a lubricant, a release agent, a nucleating agent, an antistatic agent, a pigment, a dye, and combinations thereof, without being limited thereto. The additives may be present in an amount of about 0.001 parts by weight to about 40 parts by weight, for example, about 0.1 to about 10 parts by weight, relative to about 100 parts by weight of the thermoplastic resin.

In one embodiment, the thermoplastic resin composition may be prepared in pellet form by mixing the aforementioned components, followed by melt extrusion using a typical twin-screw extruder at about 180° C. to about 240° C., for example, about 190° C. to about 220° C.

In some embodiments, the thermoplastic resin composition may have an antibacterial activity of about 2 to about 7, for example, about 3 to about 6.5 against each of *Staphylococcus aureus* and *Escherichia coli*, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

In some embodiments, the thermoplastic resin composition may have a flame retardancy of V-0 or higher, as measured on a 1.5 mm thick specimen in accordance with UL-94 vertical test.

In some embodiments, the thermoplastic resin composition may have an antibacterial activity after immersion in detergent of about 2 to about 6.5, for example, about 3 to about 6.2 against each of *Staphylococcus aureus* and *Escherichia coli*, as measured on a 5 cm×5 cm specimen in accordance with JIS Z 2801, in which the specimen is prepared by immersing an injection molded specimen in an acidic detergent for 24 hours, taking out the specimen, inoculating *Staphylococcus aureus* and *Escherichia coli* into each specimen, followed by culturing under conditions of 35° C. and 90% RH for 24 hours.

A molded article according to the present invention is formed of the thermoplastic resin composition set forth above. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles may exhibit good properties in terms of antibacterial properties, flame retardancy, chemical and bacterial resistance, and balance therebetween, and thus may be used in various fields, such as interior/exterior materials for electric/electronic products, and the like.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Polyolefin Resin

Polypropylene resin (Manufacturer: Lotte Chemical Corp.) having a weight average molecular weight (Mw) of 248,600 g/mol was used.

(B) Flame Retardant

Melamine polyphosphate (Manufacturer: Presafer, product name: EPFR-MPP300) was used.

(C) Antibacterial Agent (C1) Metallic zinc was melted in a reactor, followed by heating to 900° C. to vaporize the molten zinc, and then oxygen gas was injected into the reactor, followed by cooling to room temperature (25° C.) to obtain an intermediate. Then, the intermediate was subjected to heat treatment at 700° C. for 90 minutes, followed by cooling to room temperature (25° C.), thereby preparing zinc oxide (C1).

(C2) Zinc oxide (Manufacturer: Ristecbiz Co., Ltd., product name: RZ-950) was used.

(C3) Zinc oxide (Manufacturer: Hanil Chemical Co., Ltd., product name: TE30) was used.

Average particle diameter, BET surface area, purity, peak intensity ratio (B/A) of peak B in the wavelength range of 450 nm to 600 nm to peak A in the wavelength range of 370 nm to 390 nm in photoluminescence measurement, and crystallite size of the zinc oxides (C1), (C2) and (C3) are shown in Table 1.

(C4) Silver-based antibacterial agent (Manufacturer: Fuji Chemical Industries, product name: BM-102SD) was used.

(D) Phosphorus Compound (D1) monosodium phosphate (Manufacturer: Sigma-Aldrich, product name: S3139) was used.

(D2) disodium phosphate (Manufacturer: Sigma-Aldrich, product name: P8135) was used.

(D3) triphenyl phosphate (Manufacturer: Daihachi, product name: TPP) was used as an aromatic phosphate compound.

TABLE 1

| | (C1) | (C2) | (C3) |
|---|---|---|---|
| Average particle diameter (μm) | 1.2 | 0.890 | 3.7 |
| BET surface area (m$^2$/g) | 4 | 15 | 14 |
| Purity (%) | 99 | 97 | 97 |
| PL peak intensity ratio (B/A) | 0.28 | 9.8 | 9.5 |
| Crystallite size (Å) | 1,417 | 503 | 489 |

Property Evaluation (1) Average particle size (unit: μm): Average particle size (volume average) was measured using a particle size analyzer (Laser Diffraction Particle size analyzer LS 13 320, Beckman Coulter Co., Ltd.).

(2) BET surface area (unit: m$^2$/g): BET surface area was measured by a nitrogen gas adsorption method.

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He-Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Co., Ltd.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size}(D) = \frac{K\lambda}{\beta\cos\theta} \qquad \text{[Equation 1]}$$

where K is a shape factor, λ is an X-ray wavelength, β is an FWHM value (degree), and θ is a peak position degree.

Examples 1 to 6 and Comparative Examples 1 to 10

The aforementioned components were mixed in amounts as listed in Tables 2, 3 and 4, followed by extrusion at 200° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 200° C., mold temperature: 60° C.), thereby preparing a specimen. The prepared specimen was evaluated as to the following properties. Results are shown in Tables 2, 3 and 4.

Property Evaluation (1) Antibacterial activity: Antibacterial activity was measured on a 5 cm×5 cm specimen obtained by inoculation with each of *Staphylococcus aureus* and *Escherichia coli*, followed by culturing under conditions of 35° C. and 90% RH for 24 hours, in accordance with JIS Z 2801.

(2) Flame retardancy: Flame retardancy of a 1.5 mm thick specimen was measured by the UL-94 vertical test method.

(3) Antibacterial activity after immersion in detergent (chemical and bacterial resistance): an injection molded specimen having a size of 5 cm×5 cm was immersed in an acidic detergent (Manufacturer: CXS Corporation, product name: CXS Acid Toilet Cleaner) for 24 hours and taken out. *Staphylococcus aureus* and *Escherichia coli* were separately inoculated into each specimen, and cultured under conditions of 35° C. and 90% RH for 24 hours. Then, antibacterial activity after immersion was measured on the specimen in accordance with JIS Z 2801.

TABLE 2

| | Example | | | | | |
|---|---|---|---|---|---|---|
| | 1 | 2 | 3 | 4 | 5 | 6 |
| (A) (parts by weight) | 100 | 100 | 100 | 100 | 100 | 100 |
| (B) (parts by weight) | 26 | 45 | 65 | 26 | 45 | 65 |
| (C1) (parts by weight) | 2.6 | 10 | 17.4 | 2.6 | 10 | 17.4 |
| (C2) (parts by weight) | — | — | — | — | — | — |
| (C3) (parts by weight) | — | — | — | — | — | — |
| (C4) (parts by weight) | — | — | — | — | — | — |
| (D1) (parts by weight) | 2.6 | 18 | 34.8 | — | — | — |
| (D2) (parts by weight) | — | — | — | 2.6 | 18 | 34.8 |
| (D3) (parts by weight) | — | — | — | — | — | — |
| Antibacterial activity Escherichia coli | 5.0 | 6.2 | 6.2 | 5.0 | 6.2 | 6.2 |
| Staphylococcus aureus | 4.0 | 4.8 | 4.6 | 4.0 | 4.6 | 4.6 |
| Flame retardancy | V-0 | V-0 | V-0 | V-0 | V-0 | V-0 |
| Antibacterial activity after immersion in detergent Escherichia coli | 4.4 | 5.4 | 6.2 | 4.4 | 5.6 | 6.2 |
| Staphylococcus aureus | 3.8 | 4.4 | 4.6 | 3.8 | 4.4 | 4.6 |

TABLE 3

| | Comparative Example | | | | | |
|---|---|---|---|---|---|---|
| | 1 | 2 | 3 | 4 | 5 | 6 |
| (A) (parts by weight) | 100 | 100 | 100 | 100 | 100 | 100 |
| (B) (parts by weight) | 5 | 85 | 45 | 45 | 45 | 45 |
| (C1) (parts by weight) | 10 | 10 | 0.5 | 30 | 10 | 10 |
| (C2) (parts by weight) | — | — | — | — | — | — |
| (C3) (parts by weight) | — | — | — | — | — | — |
| (C4) (parts by weight) | — | — | — | — | — | — |
| (D1) (parts by weight) | 18 | 18 | 18 | 18 | 0.5 | 55 |
| (D2) (parts by weight) | — | — | — | — | — | — |
| (D3) (parts by weight) | — | — | — | — | — | — |
| Antibacterial activity Escherichia coli | 6.2 | unable to extrude | 1.2 | 6.2 | 6.0 | unable to extrude |
| Staphylococcus aureus | 4.6 | | 0.8 | 4.6 | 4.4 | |
| Flame retardancy | Fail | | Fail | Fail | Fail | |
| Anti bacterial activity after immersion in detergent Escherichia coli | 5.5 | | 0.8 | 6.2 | 5.0 | |
| Staphylococcus aureus | 4.4 | | 0 | 4.6 | 3.8 | |

TABLE 4

| | Comparative Example | | | |
|---|---|---|---|---|
| | 7 | 8 | 9 | 10 |
| (A) (parts by weight) | 100 | 100 | 100 | 100 |
| (B) (parts by weight) | 45 | 45 | 45 | 45 |
| (C1) (parts by weight) | — | — | — | 10 |
| (C2) (parts by weight) | 10 | — | — | — |
| (C3) (parts by weight) | — | 10 | — | — |
| (C4) (parts by weight) | — | — | 10 | — |
| (D1) (parts by weight) | 18 | 18 | 18 | — |
| (D2) (parts by weight) | — | — | — | — |
| (D3) (parts by weight) | — | — | — | 18 |
| Antibacterial activity Escherichia coli | 3.2 | 3.0 | 6.0 | 5.8 |
| Staphylococcus aureus | 1.5 | 1.5 | 4.4 | 4.2 |
| Flame retardancy | V-0 | V-0 | V-0 | Fail |
| Antibacterial activity after immersion in detergent Escherichia coli | 3.0 | 2.0 | 1.2 | 5.0 |
| Staphylococcus aureus | 1.2 | 0.8 | 0.6 | 3.8 |

From the above results, it can be seen that the thermoplastic resin composition according to the present invention had good properties in terms of flame retardancy, antibacterial properties, chemical and bacterial resistance and the like.

In contrast, it could be seen that the composition of Comparative Example 1 prepared using a small amount of the flame retardant suffered from flame retardancy; the composition of Comparative Example 2 prepared using an excess of the flame retardant could not be extruded (deteriorated in processability), thus physical properties could not be evaluated; the composition of Comparative Example 3 prepared using a small amount of the zinc oxide suffered from deterioration in antibacterial properties, flame retardancy, chemical and bacterial resistance and the like; the composition of Comparative Example 4 prepared using an excess of the zinc oxide suffered from deterioration in flame retardancy; the composition of Comparative Example 5 prepared using a small amount of sodium phosphate suffered from deterioration in flame retardancy; the composition of Comparative Example 6 prepared using an excess of sodium phosphate could not be extruded (deteriorated in processability), thus physical properties could not be evaluated; and the compositions of Comparative Examples 7 and 8 prepared using zinc oxide (C2) and zinc oxide (C3) respectively, instead of zinc oxide (C1) of the present invention suffered from deterioration in antibacterial properties and chemical and bacterial resistance; the composition of Comparative Example 9 prepared using silver-based antibacterial agent (C4) instead of zinc oxide (C1) of the present invention exhibited deteriorated chemical and bacterial resistance; the composition of Comparative Example 10 prepared using triphenyl phosphate (D3) instead of sodium phosphate (D1) of the present invention suffered from deterioration in flame retardancy.

It should be understood that various modifications, changes, alterations, and equivalent embodiments can be made by those skilled in the art without departing from the spirit and scope of the invention.

The invention claimed is:

1. A thermoplastic resin composition comprising:
   about 100 parts by weight of a polyolefin resin;
   about 10 parts by weight to about 80 parts by weight of a flame retardant excluding sodium phosphate;
   about 1 part by weight to about 25 parts by weight of a zinc oxide having an average particle size of about 0.2 µm to about 3 µm and a BET specific surface area of about 1 m$^2$/g to about 10 m$^2$/g; and
   about 1 part by weight to about 50 parts by weight of a sodium phosphate,
   wherein a weight ratio of the zinc oxide to the sodium phosphate ranges from about 1:0.5 to about 1:3.

2. The thermoplastic resin composition according to claim 1, wherein the polyolefin resin includes polypropylene, polyethylene, and/or propylene-ethylene copolymer.

3. The thermoplastic resin composition according to claim 1, wherein the flame retardant includes phosphorus-nitrogen-based flame retardants, nitrogen-based flame retardants, phosphorus-based flame retardant, halogen-based flame retardant, and/or antimony-based flame retardant.

4. The thermoplastic resin composition according to claim 1, wherein the flame retardant includes phosphorus-nitrogen-based flame retardant and/or nitrogen-based flame retardant.

5. The thermoplastic resin composition according to claim 1, wherein the zinc oxide has a peak intensity ratio (B/A) of about 0.01 to about 1, where A indicates intensity of the peak in the wavelength range of 370 nm to 390 nm and B indicates intensity of the peak in the wavelength range of 450 nm to 600 nm in photoluminescence measurement.

6. The thermoplastic resin composition according to claim 1, wherein the zinc oxide has a peak position (2θ) in the range of 35° to 37° and a crystallite size of about 1,000 Å to about 2,000 Å, in X-ray diffraction (XRD) analysis, as calculated by Equation 1:

$$\text{Crystallite size}(D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

7. The thermoplastic resin composition according to claim 1, wherein a weight ratio of the flame retardant to the zinc oxide ranges from about 2:1 to about 15:1.

8. The thermoplastic resin composition according to claim 1, wherein the thermoplastic resin composition has an antibacterial activity of about 2 to about 7 against each of *Staphylococcus aureus* and *Escherichia coli*, as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

9. The thermoplastic resin composition according to claim 1, wherein the thermoplastic resin composition has a flame retardancy of V-0 or higher, as measured on a 1.5 mm thick specimen in accordance with UL-94 vertical test.

10. The thermoplastic resin composition according to claim 1, wherein the thermoplastic resin composition has an antibacterial activity of about 2 to about 6.5 against each of *Staphylococcus aureus* and *Escherichia coli*, as measured on a 5 cm×5 cm specimen in accordance with JIS Z 2801, in which the specimen is prepared by immersing an injection molded specimen in an acidic detergent for 24 hours, taking out the specimen, inoculating *Staphylococcus aureus* and *Escherichia coli* into each specimen, followed by culturing under conditions of 35° C. and 90% RH for 24 hours.

11. A molded article formed of the thermoplastic resin composition according to claim 1.

12. The thermoplastic resin composition according to claim 1, wherein a weight ratio of the zinc oxide to the sodium phosphate ranges from about 1:1 to about 1:2.

13. The thermoplastic resin composition according to claim 1, wherein the flame retardant excluding sodium phosphate is selected from the group consisting of piperazine pyrophosphate (PPP), melamine polyphosphate (MPP), melamine cyanurate, and combinations thereof.

14. The thermoplastic resin composition according to claim 13, wherein the flame retardant excluding sodium phosphate is piperazine pyrophosphate (PPP), melamine polyphosphate (MPP), or a combinations thereof.

15. The thermoplastic resin composition according to claim 13, wherein the flame retardant excluding sodium phosphate is melamine cyanurate.

16. The thermoplastic resin composition according to claim 1, wherein the flame retardant excluding sodium phosphate is a phosphorus-based flame retardant.

17. The thermoplastic resin composition according to claim 16, wherein the phosphorus-based flame retardant is selected from the group consisting phosphate compounds, phosphonate compounds, phosphinate compounds, phosphine oxide compounds, phosphazene compounds, metal salts thereof, and combinations thereof.

* * * * *